DE LANCEY A. CAMERON.
MACHINE FOR MAKING PLASTER BOARD.
APPLICATION FILED MAY 20, 1911.
1,028,930.
Patented June 11, 1912.
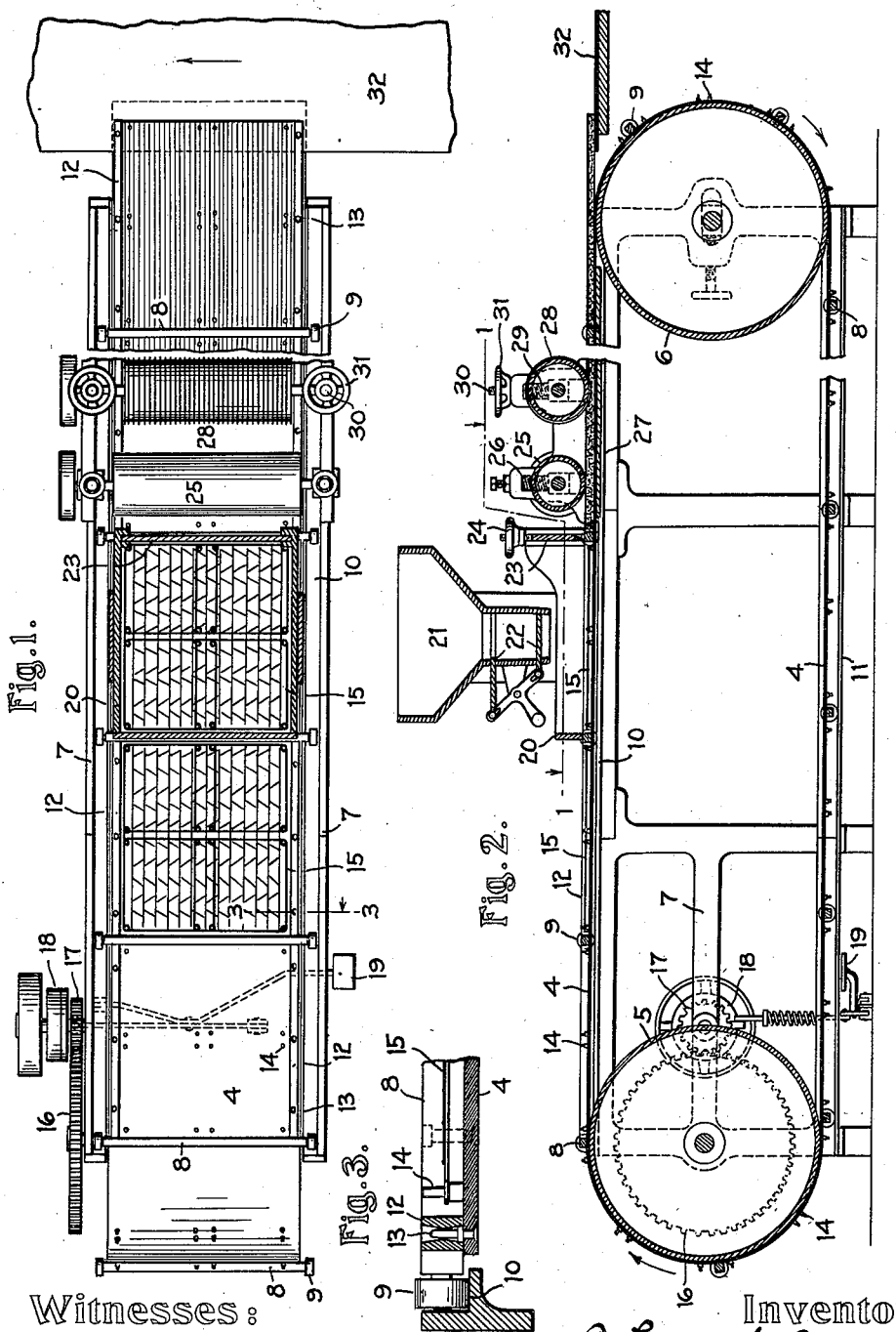
Witnesses:
C. W. Carroll
L. Thon
Inventor:
DeLancey A. Cameron
by his attorneys
Osgood, Davis & Dorsey

UNITED STATES PATENT OFFICE.

DE LANCEY A. CAMERON, OF GENESEO, NEW YORK, ASSIGNOR TO DELAC PLASTER CO., OF MUMFORD, NEW YORK, A CORPORATION OF NEW YORK.

MACHINE FOR MAKING PLASTER-BOARD.

1,028,930.

Specification of Letters Patent.

Patented June 11, 1912.

Application filed May 20, 1911. Serial No. 628,569.

*To all whom it may concern:*

Be it known that I, DE LANCEY A. CAMERON, a citizen of the United States, and resident of Geneseo, in the county of Livingston and State of New York, have invented certain new and useful Improvements in Machines for Making Plaster-Board, of which the following is a specification.

This invention relates to the manufacture of plaster-board such as used in building-construction as a substitute for lathing and plaster, and which usually comprises a body of plastic and fibrous materal, together with reinforcements of wire embedded in the plastic material.

One object of the invention is to produce a machine for manufacturing plaster-board by which the edges of the boards shall be molded smoothly, thereby dispensing with the trimming of the edges and producing boards of exactly equal size and uniform character, this machine being adapted moreover to operate continuously.

Other objects of the invention, and the several features of construction and operation by which they are accomplished, will be set forth in connection with the following description of the illustrated embodiment of the invention.

In the accompanying drawings: Figure 1 is a plan-view of a machine embodying the present invention, shown in section on the line 1—1 in Fig. 2; Fig. 2 is a longitudinal section of the machine shown in Fig. 1; and Fig. 3 is a detail view, on a larger scale, in vertical section on the line 3—3 in Fig. 1.

In the illustrated embodiment of the invention the plaster-board is molded in successive pieces or boards upon a wide, flat bed which constitutes the bottom of the molds. This bed is in the form of an endless belt 4 running over pulleys or drums 5 and 6 journaled at the ends of the machine. The bed is made of suitable flexible material which must also be impervious to the moisture of the plastic composition, and I have found that rubber makes the best material for the surface of the bed, as it is impervious and flexible and does not adhere to the plaster. The body of the bed may be of textile fabric such as canvas.

The drums 5 and 6 are journaled in a frame 7, which is broken away in the drawings to indicate that it may be of indefinite length. Between these drums the upper and lower portions of the bed are stretched in horizontal position. The bed is divided transversely by a succession of uniformly-spaced cross-bars 8 which are riveted, or otherwise permanently secured, to the material of the bed. To support the horizontal portions of the bed each bar 8 is provided at the ends with rollers 9, which travel along upper and lower horizontal tracks 10 and 11 respectively. The cross-bars, in addition to stiffening and supporting the bed, constitute also the end-walls of the molds by which the successive boards are formed, the bed constituting the bottom of these molds. The sides of the molds are formed by side-bars 12. These bars are of the same height as the cross-bars 8, but they are removable from the bed. As shown in Fig. 3, the bed is provided near its edges with studs 13, and the bars 12 are provided with corresponding tapered openings adapted to engage the studs so as to properly locate and fix the side-bars upon the bed. As the bed progresses from left to right at its upper portion, the bars are placed in position thereon by the operator of the machine so as to complete the successive molds, which then pass on to the point where the plastic material is discharged into the molds.

As the several operations by which each board is formed require that the movement of the machine be interrupted periodically, the machine is provided with means for actuating the belt intermittently through a space equal to the distance beteween two of the cross-bars. For this purpose the drum 5 is connected with a gear 16 which meshes with a pinion 17, and the diameters of the pinion and the gear are such that one rotation of the pinion moves the bed the required distance. To actuate the pinion it is connected with a one-rotation clutch 18 of any well-known or suitable form, which is controlled by a treadle 19 at the front of the machine. The clutch is rotated constantly by connection with any suitable source of power, and when the treadle is momentarily depressed the clutch is released and actuates the pinion through one rotation.

By the successive movements of the bed just described each mold is brought in turn to the point where the plastic material is discharged into it. At this point the mold lies directly beneath a guard 20 which surrounds the mold to prevent the escape of material therefrom. Above the mold at this point is a hopper 21 containing the plastic material, and the discharge from this hopper is controlled by a measuring-valve 22, of familiar form, by which a measured quantity of material may be discharged into the mold. After the material has been so discharged the next movement of the bed carries the mold to the right, beneath a scraper in the form of a vertical plate 23. This scraper removes surplus material from the mold, leaving the mold filled up to, or slightly above, the level of the upper surface of the cross-bars and side-bars. This scraper is vertically adjustable by means of hand-wheels 24 to regulate the amount of material left in the mold.

After leaving the hopper the mold passes beneath a pressing-roller 25. This roller is journaled above the bed, and its bearings are pressed downward by springs 26 so as to press the roller against the upper surface of the material in the mold. The roller acts to compress and smooth the material, so that the mold is completely filled, and it also reduces the board to exactly the required thickness, since the side-bars 12 are engaged by the ends of the roller and act as stops to limit its downward movement. During the operation of this roller the bed is firmly supported by a smooth metal plate 27 fixed to the frame of the machine in position to engage and support the lower surface of the bed.

Where the plaster-board is to be used on the outside of a building it is usually protected with an outside coating of plaster applied to the surface of the board after the board has been nailed in place. To insure the firm adhesion of this coating it is necessary to roughen the surface of the board, and for this purpose the machine is provided with a roller 28 having a corrugated, or otherwise roughened, surface adapted to impress the surface of the board as the latter passes under the roller. The roughening-roller is journaled with provision for vertical movement, its bearings being pressed downward by springs 29, and as it is not always necessary to use this roller means are provided for raising it out of operative position when necessary. To this end the bearing-blocks are provided with screw-threaded stems 30 projecting upwardly and engaging threaded hand-wheels 31 which may be rotated to raise the bearings and the roller out of operative position.

After passing to the right beneath the rollers, the completed boards must be undisturbed for a sufficient interval of time to permit the plaster to set. For this reason the machine may be extended indefinitely to the right so as to permit a succession of boards to remain in the molds until the drum 6 is reached.

The machine is not illustrated in its full length in the drawings, but is shown as broken away at the right of the roughening-roller.

The boards, after they have set, are discharged from the molds upon a support or table 32, which may be a portion of a horizontally-moving conveyer-belt by which the boards are carried away to a convenient point of discharge or storage. As the bed curves around the drum 6 the board, which has become set and stiff, does not follow the bed, but projects horizontally over the upper surface of the support 32, as shown in Fig. 2, until finally it is completely discharged thereon by the continued movement of the bed and the cross-bars. At the same time the side-bars 12 are also separated from the bed and discharged upon the support 32, which thus constitutes means for removing the bars from the bed. The bars are then returned by the operator to the other end of the machine, to be placed in position again upon the bed, the same side-bars being thus used over and over, although not permanently attached to the bed.

The bed is provided with studs or abutments by which wire reinforcements may be located and fixed in proper position in the molds, to be embodied in the plastic material. As shown particularly in Fig. 3, these studs 14 are riveted to the bed, and are provided with shoulders. In Figs. 1 and 3 reinforcing wires 15 are shown as mounted upon these studs, these reinforcements being of a form disclosed and claimed in a copending application filed by me of even date herewith. The wires are provided with loops or eyes which engage the studs 14 and rest upon the shoulders, being thus firmly held in proper position as to their distance from the edges of the boards and also in proper vertical position to be embedded in the plastic material. Wire-netting may also be employed in the usual manner to reinforce the bodies of the boards, such netting being merely laid in the molds, as shown in Fig. 1. The side-bars 12 and the reinforcing wires are placed in position upon the bed by an operator standing at the left-hand end of the machine, and this same operator controls the movements of the bed by means of the treadle 19 so as to permit the bed to move into a fresh position, after each mold has been set up, to properly receive the plastic material. The same operator may maipulate the measuring-valve 22, or this valve may be operated automatically in any suitable manner.

My invention is not limited to the embodiment thereof hereinbefore described, as it is illustrated in a more or less diagrammatic manner, but may be embodied in various forms within the nature of the invention as it is defined in the following claims.

I claim:—

1. A machine for making plaster-board comprising a flexible, endless bed adapted to constitute the bottoms of a succession of molds, rigid side-bars removably secured to and carried by the lateral edges of the bed to constitute side-walls for said molds, drums over which the bed is stretched, means for moving the bed about said drums, and means for removing the side bars automatically from the bed as it passes over one of the drums.

2. A machine for making plaster-board comprising a flexible, endless bed adapted to constiutute the bottom of a succession of molds, cross-bars normally fixed to the bed to constitute the end-walls of the molds, rigid side-bars mounted upon the lateral edges of the bed to constitute the side-walls of the molds, the side bars being separable from the bed by movement in a plane normal thereto, drums over which the bed is stretched, means for moving one of the drums intermittently to advance the bed, means for discharging plastic material into the molds, and a support adjacent one of the drums and substantially on a level with the upper surface of the bed so as to receive from the bed the molded boards and the side-bars as the bed passes around said drum.

3. A machine for making plaster-board comprising an endless belt of flexible material adapted to constitute the bottom of a succession of molds, cross-bars normally fixed to the bed to constitute the end-walls of the molds, drums over which the bed is stretched, means for moving the bed and the drums intermittently, and rigid side-bars constituting the sides of the mold, the side-bars and the bed having coöperating abutments and recesses whereby the side-bars are temporarily secured in place on the bed but are permitted to separate from the bed, with the finished plaster-board, when the bed reaches one of said drums.

DE LANCEY A. CAMERON.

Witnesses:
FARNUM F. DORSEY,
D. GURNEE.

---

Copies of this patent may be obtained for five cents each, by addressing the "Commissioner of Patents, Washington, D. C."